(12) United States Patent
Hah et al.

(10) Patent No.: US 10,128,502 B2
(45) Date of Patent: Nov. 13, 2018

(54) POSITIVE ELECTRODE ACTIVE MATERIAL AND LITHIUM SECONDARY BATTERY INCLUDING THE SAME

(71) Applicants: LG Chem, Ltd., Seoul (KR); Research Affairs of SNU & SNU R&DB Foundation, Seoul (KR)

(72) Inventors: Hoe Jin Hah, Daejeon (KR); Sun Sik Shin, Daejeon (KR); Kyoung Ho Kim, Daejeon (KR); Il Hong Kim, Daejeon (KR); Je Young Kim, Daejeon (KR); Kisuk Kang, Daejeon (KR); Jihyun Hong, Daejeon (KR)

(73) Assignees: LG Chem, Ltd. (KR); Research Affairs of SNU & SNU R&DB Foundation (KR)

( * ) Notice: Subject to any disclaimer, the term of this patent is extended or adjusted under 35 U.S.C. 154(b) by 80 days.

(21) Appl. No.: 15/124,491

(22) PCT Filed: Mar. 12, 2015

(86) PCT No.: PCT/KR2015/002391
§ 371 (c)(1),
(2) Date: Sep. 8, 2016

(87) PCT Pub. No.: WO2015/137744
PCT Pub. Date: Sep. 17, 2015

(65) Prior Publication Data
US 2017/0018773 A1    Jan. 19, 2017

(30) Foreign Application Priority Data
Mar. 12, 2014 (KR) .................. 10-2014-0028887

(51) Int. Cl.
*H01M 4/00* (2006.01)
*H01M 4/525* (2010.01)
(Continued)

(52) U.S. Cl.
CPC ............ *H01M 4/525* (2013.01); *C01G 53/50* (2013.01); *C01G 55/002* (2013.01);
(Continued)

(58) Field of Classification Search
CPC ...................................................... H01M 4/00
See application file for complete search history.

(56) References Cited

U.S. PATENT DOCUMENTS

| | | |
|---|---|---|
| 6,346,348 B1 | 2/2002 | Nakajima et al. |
| 6,677,082 B2 | 1/2004 | Thackeray et al. |
| (Continued) | | |

FOREIGN PATENT DOCUMENTS

| | | |
|---|---|---|
| CN | 102056844 A | 5/2011 |
| CN | 102916176 A | 2/2013 |
| (Continued) | | |

OTHER PUBLICATIONS

International Search Report from PCT/KR2015/002391, dated May 29, 2015.
(Continued)

*Primary Examiner* — Jacob B Marks
(74) *Attorney, Agent, or Firm* — Lerner, David, Littenberg, Krumholz & Mentlik, LLP

(57) ABSTRACT

Disclosed herein are a positive electrode active material including at least one selected from among compounds represented by Formula 1 below and a lithium secondary battery including the same that is capable of improving lifetime characteristics and rate characteristics while exhibiting excellent safety: $xLi_2M_yMn_{(1-y)}O_{3-z}A_z*(1-x)LiM'O_{2-z'}A'_{z'}$ (1), where M is at least one element selected from a group consisting of Ru, Mo, Nb, Te, Re, Ir, Pt, Cr, S, W, Os, and Po, M' is at least one element selected from a group consisting of Ni, Ti, Co, Al, Mn, Fe, Mg, B, Cr, Zr, Zn, and second row transition metals, A and A' are each independently a negative monovalent or divalent anion, and $0<x<1$, $0.3<y<1$, $0 \leq z<0.5$, and $0 \leq z'<0.5$.

18 Claims, 2 Drawing Sheets

(51) Int. Cl.
*H01M 4/505* (2010.01)
*C01G 53/00* (2006.01)
*C01G 55/00* (2006.01)
*H01M 4/36* (2006.01)
*H01M 4/485* (2010.01)
*H01M 10/0525* (2010.01)
*H01M 4/131* (2010.01)
*H01M 10/052* (2010.01)
*H01M 4/02* (2006.01)

(52) U.S. Cl.
CPC ........... *H01M 4/131* (2013.01); *H01M 4/364* (2013.01); *H01M 4/366* (2013.01); *H01M 4/485* (2013.01); *H01M 4/505* (2013.01); *H01M 10/0525* (2013.01); *C01P 2006/40* (2013.01); *H01M 10/052* (2013.01); *H01M 2004/028* (2013.01); *H01M 2220/00* (2013.01); *Y02T 10/7011* (2013.01)

(56) References Cited

U.S. PATENT DOCUMENTS

| | | |
|---|---|---|
| 2002/0136954 A1 | 9/2002 | Thackeray et al. |
| 2011/0089369 A1 | 4/2011 | Patoux et al. |
| 2011/0226985 A1 | 9/2011 | Park et al. |
| 2013/0136993 A1 | 5/2013 | Nakano |

FOREIGN PATENT DOCUMENTS

| | | | |
|---|---|---|---|
| JP | 2000231920 A | | 8/2000 |
| JP | 2005235628 A | | 9/2005 |
| JP | 2012-129102 | * | 7/2012 |
| JP | 2012129102 A | | 7/2012 |
| JP | 2012204291 A | | 10/2012 |
| KR | 20090006897 A | | 1/2009 |
| KR | 20130058590 A | | 6/2013 |

OTHER PUBLICATIONS

Singh, et al., "Electrochemical Behavior of Cr-Doped Composite Li2MnO3-LiMn0.5O2 Cathode Materials." Journal of the Electrochemical Society, 2012, vol. 159, No. 4, pp. A410-A420. Published online Jan. 30, 2012.

Sathiya et al., "High Performance Li2Ru1-yMnyO3 (0.2 < y <0.8) Cathode Materials for Rechargeable Lithium-Ion Batteries: Their Understanding", Chemistry of Materials, Mar. 2013, vol. 25, pp. 1121-1131.

* cited by examiner

[FIG. 1]
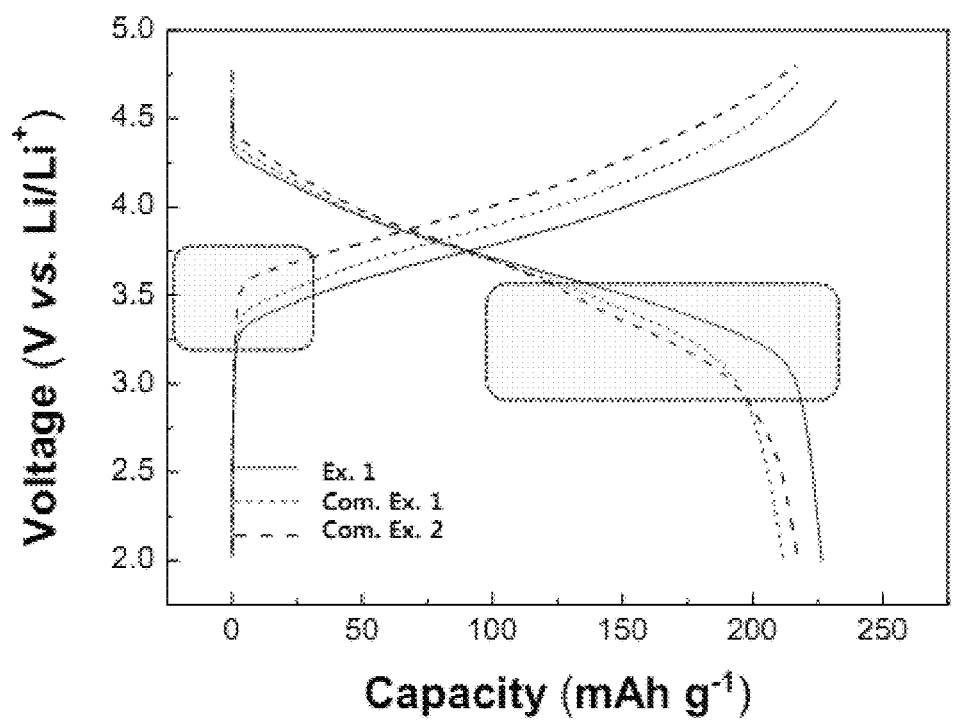

[FIG. 2]
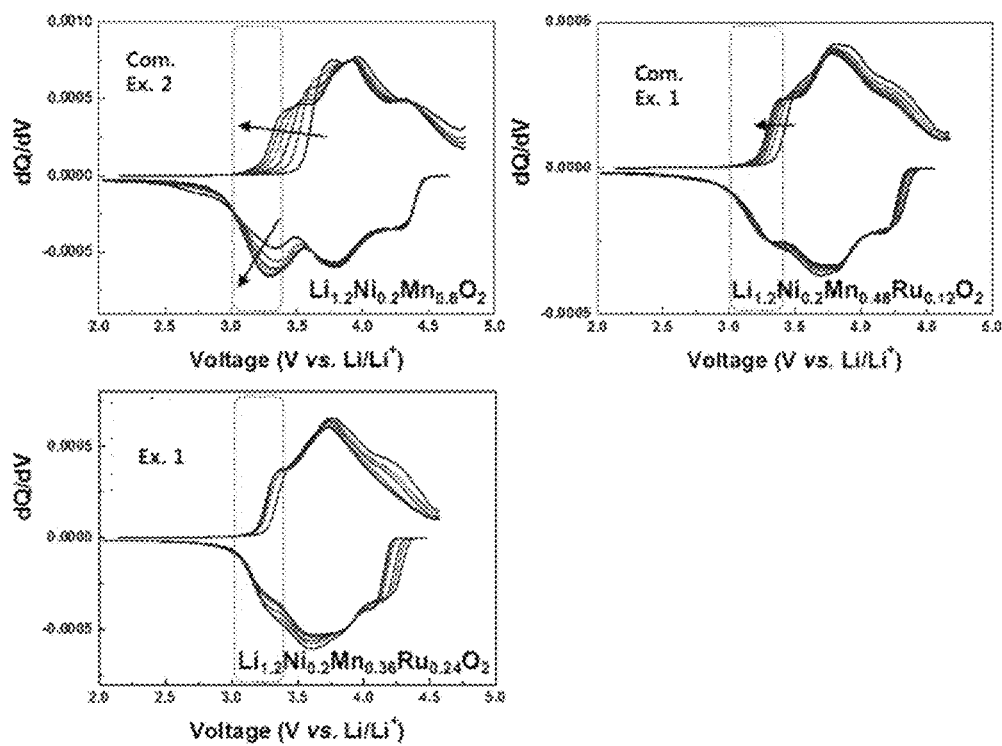

POSITIVE ELECTRODE ACTIVE MATERIAL AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR2015/002391, filed Mar. 12, 2015, which claims priority to Korean Patent Application No. 10-2014-0028887, filed Mar. 12, 2014, the disclosures of which are incorporated herein by reference.

TECHNICAL FIELD

The present invention relates to a positive electrode active material and a lithium secondary battery including the same that is capable of improving lifetime characteristics and rate characteristics while exhibiting excellent safety.

BACKGROUND ART

In recent years, with increased concerns about environmental problems, much research has been carried out into electric vehicles (EV) and hybrid electric vehicles (HEV), which are capable of substituting for vehicles using fossil fuel, such as gasoline and diesel oil, which cause air pollution. Nickel-metal hydride (Ni-MH) secondary batteries have been mainly used as a power source for the electric vehicles and the hybrid electric vehicles. On the other hand, much research has also been carried out into lithium secondary batteries having high energy density, high discharge voltage, and high output stability, and some of the lithium secondary batteries are now commercialized.

In particular, it is necessary for lithium secondary batteries used for electric vehicles to exhibit high energy density and to provide high output within a short time. In addition, it is also necessary for lithium secondary batteries used for electric vehicles to be used for 10 years or more under severe conditions. For these reasons, lithium secondary batteries used for electric vehicles require higher safety and longer lifespan than conventional small-sized lithium secondary batteries. In addition, secondary batteries used for electric vehicles (EV) and hybrid electric vehicles (HEV) require excellent rate characteristics and excellent power characteristics based on the operation conditions of a vehicle.

Carbon materials are mainly used for negative electrode active materials of a lithium secondary battery, and the use of lithium metals and sulfur compounds is under consideration. In addition, lithium-containing cobalt oxides, such as $LiCoO_2$, are mainly used for positive electrode active materials of a lithium secondary battery, and the use of lithium-containing manganese oxides, such as $LiMnO_2$, having a layered crystal structure, $LiMn_2O_4$, having a spinel crystal structure, and lithium-containing nickel oxides, such as $LiNiO_2$, is also under consideration.

Among the positive electrode active materials, $LiCoO_2$ is widely used due to its excellent lifetime characteristics and high charge and discharge efficiency, but has low structural stability. In addition, due to the resource limitations of cobalt, which is a raw material, $LiCoO_2$ is expensive, and therefore price competitiveness is low, whereby the massive use thereof as power sources in fields such as electric vehicles is limited.

$LiNiO_2$ is relatively inexpensive, and makes it possible for a battery to have high discharge capacity. However, phase transition abruptly occurs in the crystal structure of $LiNiO_2$ depending on the change in volume of the battery caused by charge and discharge of the battery. In addition, when $LiNiO_2$ is exposed to air and moisture, the safety of $LiNiO_2$ is abruptly lowered.

In addition, lithium manganese oxides, such as $LiMnO_2$ and $LiMn_2O_4$, exhibit excellent thermal safety and are inexpensive. However, the use of lithium manganese oxides entails a small charge capacity, poor cycle characteristics, and poor high-temperature characteristics.

For these reasons, much research has been carried out into new positive electrode active materials that have structures other than the above-mentioned structures.

For example, research has been carried out into an oxide containing excessive lithium, e.g. a lithium transition metal oxide containing a high content of Mn, wherein the content of lithium is higher than the content of the transition metal such that a high capacity of 270 or more mAh/g is exhibited at a high voltage of 4.5 V or higher.

However, the oxide containing excessive lithium has a high irreversible capacity. Furthermore, in addition to lithium, oxygen escapes from the active material structure at the time of high-voltage activation to utilize excess lithium. As a result, the active material structure may collapse, and a voltage sagging phenomenon may occur, whereby the deterioration of the battery cell may be accelerated.

Meanwhile, many researchers have proposed methods of using a positive electrode active material containing $Li_2MnO_3$ in a layered structure in order to secure the structural stability of the positive electrode active material having such a layered structure. In this case, the positive electrode active material contains a large amount of Mn. As a result, the positive electrode active material is very cheap and exhibits large capacity and high stability at high voltage. After the activation of a flat range of 4.4 V to 4.6 V, however, the transition from the layered structure to the spinel structure is performed, and therefore the contact between domains is weakened. As a result, the positive electrode active material may be excessively structurally changed, whereby the improvement of electrical properties may not be satisfied.

That is, the structure of a secondary battery that exhibits desired lifetime characteristics and safety has not yet been proposed.

DISCLOSURE

Technical Problem

The present invention has been made to solve the above problems and other technical problems that have yet to be resolved.

As a result of a variety of extensive and intensive studies and experiments to solve the problems described above, the inventors of the present application have developed a positive electrode active material for secondary batteries including compounds represented by Formula 1, as will be described hereinafter, and have found that the positive electrode active material exhibits structural stability during the charge and discharge of a secondary battery, and therefore a secondary battery including the positive electrode active material exhibits excellent lifetime characteristics and rate characteristics as well as safety. The present invention has been completed based on these findings.

Technical Solution

In accordance with one aspect of the present invention, the above and other objects can be accomplished by the provision of a positive electrode active material including at least one selected from among compounds represented by Formula 1 below: $xLi_2M_yMn_{(1-y)}O_{3-z}A_z*(1-x)LiM'O_{2-z'}A'_{z'}$ (1), where M is at least one element selected from the group consisting of Ru, Mo, Nb, Te, Re, Ir, Pt, Cr, S, W, Os, and Po, M' is at least one element selected from the group consisting of Ni, Ti, Co, Al, Mn, Fe, Mg, B, Cr, Zr, Zn, and second row transition metals, A and A' are each independently a negative monovalent or divalent anion, and $0<x<1$, $0.3<y<1$, $0≤z<0.5$, and $0≤z'<0.5$.

In the case in which a positive electrode active material containing excessive lithium and a high content of manganese is used, as previously described, the positive electrode active material provides a large capacity compared to the price thereof. However, oxygen escapes from the active material structure in addition to lithium at the time of high-voltage activation to utilize excess lithium. As a result, the active material structure may collapse, whereby the electrochemical performance of the positive electrode active material may be deteriorated.

The inventors of the present application have conducted much research into the manufacture of a positive electrode active material that has a stable crystal structure at high voltage while exhibiting excellent capacity and rate characteristics, and have found that in the case in which a specific element is substituted for Mn, the above problem can be solved.

Specifically, in the case in which a specific element defined as M in Formula 1 above is substituted for Mn, oxygen is prevented from escaping the active material structure at high voltage, thereby securing structural stability and thus exhibiting excellent capacity and rate characteristics. In addition, voltage necessary for high-voltage activation to utilize excess lithium may be lowered, with the result that the generation of gas is prevented due to the restraint of the decomposition of an electrolytic solution and the generation of oxygen radicals at high voltage, whereby the safety of the battery is improved.

In the present invention, M may be an element having a greater ion radius than lithium. Specifically, M may be at least one element selected from the group consisting of Ru, Mo, S, W, Os, and Po. More specifically, M may be Ru.

In Formula 1 above, M' may be a transition metal that satisfies the above conditions. For example, M' may be $Mn_aM''_{1-a}$ (where M'' is at least one element selected from a group consisting of Ni, Ti, Co, Al, Fe, Mg, B, Cr, Zr, Zn, and second row transition metals, and $0<a<1$). In particular, M'' may be a combination of at least two elements selected from the group consisting of Ni, Ti, Co, Al, Fe, Mg, B, Cr, Zr, and Zn.

Specifically, M' may be $Mn_aNi_bCo_c$ (where $0<a<1$, $0<b<1$, $0<c<1$, and $a+b+c=1$). In the case in which M' includes a combination of manganese, nickel, and cobalt, the defects of respective elements may be compensated for, whereby excellent effects may be achieved.

In addition, a, b, and c in M' may have various values within a range that satisfies the above conditions. Specifically, a may have values within a range of $0<a<0.5$. More specifically, a may have values within a range of $0.1<a<0.4$.

In Formula 1 above, x indicates a molar ratio. If x is too large, electron conductivity is lowered even though charge and discharge capacity is increased. Specifically, x may have values within a range of $0<x≤0.7$. More specifically, x may have values within a range of $0.2<x≤0.6$. Most specifically, x may be 0.5.

In Formula 1 above, if the content of y is 0.3 or less, desired effects may not be obtained. If the content of y is 1, the capacity may be reduced. Within the range in which the layered crystal structure is maintained, therefore, y may have the following range of values. Specifically, y may have values within a range of $0.4<y<1$. More specifically, y may have values within a range of $0.6≤y<1$. Most specifically, y may be 0.6.

In Formula 1 above, a predetermined amount of other anions may be substituted for oxygen ions within the range in which A and A' independently satisfy the above conditions. Specifically, A and A' may each be at least one element selected from the group consisting of halogen elements, such as F, Cl, Br, and I, sulfur, and nitrogen.

The coupling force with the transition metal is increased and the structural transition of the active material is prevented by the substitution of anions, with the result that the lifespan of the battery may be increased. If 0.5 or more moles of anions are substituted, however, the structure of the compound is not stably maintained, with the result that lifetime characteristics are lowered, which is not desirable. Consequently, the substituted amounts z and z' of the anions may have values within ranges of $0≤z≤0.2$ and $0≤z'≤0.2$. More specifically, the substituted amounts z and z' of the anions may have values within ranges of $0≤z≤0.1$ and $0≤z'≤0.1$.

The compounds represented by Formula 1 above may be layered composites or solid solutions. According to circumstances, the layered composites and the solid solutions may be mixed with each other.

M may be uniformly distributed on the surface of the compound and within the compound. According to circumstances, M may have a gradient of concentration from the surface of the compound into the interior of the compound. The content of M may be increased toward the interior of the compound. On the assumption that a portion equivalent to 1% of the range of the compound from the outermost surface to the middle of the compound based on the particle diameter of the compound is defined as the surface of the compound, 0.1 to 20 weight %, specifically 0.2 to 10 weight %, of the total weight of M may be distributed on the surface of M.

The method of manufacturing the positive electrode active material is not particularly restricted as long as the molar ratio of lithium and manganese represented by Formula 1 is maintained. For example, the positive electrode active material may be manufactured through a reaction between a transition metal hydroxide precursor and lithium carbonate. Specifically, a transition metal hydroxide precursor having a composition sufficient to obtain an oxide containing an excessive amount of lithium after reaction is prepared, the prepared transition metal hydroxide precursor is mixed with a lithium-containing precursor and M such that they react with one another, and the mixture may be plasticized at a temperature of about 800 to 1200° C. for about 8 to 24 hours to manufacture a positive electrode active material.

In accordance with another aspect of the present invention, there is provided a positive electrode formed by applying the positive electrode active material with the above-stated construction to a current collector.

The positive electrode may further include general lithium transition metal oxides that do not satisfy the above conditions as a positive electrode active material, in addition to the compounds represented by Formula 1 above. Such general lithium transition metal oxides may include oxides including only one selected from among Ni, Co, and Mn and two or more selected from among Ni, Co, and Mn. For example, all lithium transition metal oxides well-known in the art to which the present invention pertains may be included. In this case, the compounds represented by Formula 1 above may be at least 30 weight %, specifically 50 weight %, of the total weight of the positive electrode active material.

The positive electrode according to the present invention may be manufactured by mixing a positive electrode mixture including the positive electrode active material, a conductive agent, and a binder with a predetermined solvent, such as water or NMP, to manufacture a slurry, applying the slurry to a positive electrode current collector, and drying and pressing the slurry.

At least one selected from the group consisting a viscosity controlling agent and a filler may be further included in the positive electrode mixture as needed.

Generally, the positive electrode current collector has a thickness of 3 to 500 μm. The positive electrode current collector is not particularly restricted so long as the positive electrode current collector exhibits high conductivity while the positive electrode current collector does not induce any chemical change in a battery to which the positive electrode current collector is applied. For example, the cathode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. The positive electrode current collector may have a micro uneven pattern formed at the surface thereof so as to increase the adhesive strength of the positive electrode active material. The positive electrode current collector may be configured in various forms, such as a film, a sheet, a foil, a net, a porous body, a foam body, and a non-woven fabric body.

The conductive agent, which is a component for further improving the conductivity of the positive electrode active material, may be added so that the conductive agent has 0.01 to 30 weight % based on the total weight of the positive electrode mixture. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component that assists in binding between the positive electrode active material and the conductive agent and in binding with the positive electrode current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrollidone, tetrafluoroethylene, polyethylene, polypropylene, ethylene-propylene-diene terpolymer (EPDM), sulfonated EPDM, styrene butadiene rubber, fluoro rubber, and various copolymers.

The viscosity controlling agent is a component for controlling the viscosity of the electrode mixture so as to facilitate mixing of the electrode mixture and coating thereof on the current collector. The viscosity controlling agent may be added in an amount of up to 30 weight % based on the total weight of the electrode mixture. Examples of the viscosity controlling agent include carboxymethylcellulose and polyvinylidene fluoride. However, the present invention is not limited thereto. According to circumstances, the above-described solvent may also function as the viscosity controlling agent.

The filler is an optional component used to inhibit the expansion of the positive electrode. There is no particular limit to the filler so long as the filler is made of a fibrous material while the filler does not cause chemical changes in a battery to which the filler is applied. As examples of the filler, there may be used olefin polymers, such as polyethylene and polypropylene; and fibrous materials, such as glass fiber and carbon fiber.

In accordance with another aspect of the present invention, there is provided a lithium secondary battery including the positive electrode, a negative electrode, a separator, and a non-aqueous electrolytic solution containing lithium salt.

The negative electrode is manufactured by applying a negative electrode mixture including a negative electrode active material to a negative electrode current collector and drying the negative electrode mixture. The conductive agent, the binder, etc., which were previously described, may be added to the negative electrode mixture as needed.

In general, the negative electrode current collector has a thickness of 3 to 500 μm. The negative electrode current collector is not particularly restricted so long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In the same manner as in the positive electrode current collector, the negative electrode current collector may have a micro uneven pattern formed at the surface thereof so as to increase the adhesive force of the negative electrode active material. The negative electrode current collector may be configured in various forms, such as a film, a sheet, a foil, a net, a porous body, a foam body, and a non-woven fabric body.

The negative electrode active material may be, for example, carbon and graphite materials such as natural graphite, artificial graphite, expandable graphite, carbon fiber, hard carbon, carbon black, carbon nanotubes, fullerenes, and activated carbon; metals alloyable with lithium such as Al, Si, Sn, Ag, Bi, Mg, Zn, In, Ge, Pb, Pd, Pt, and Ti and compounds including these elements; complexes of metals and compounds thereof and complexes of carbon and graphite materials; and lithium-containing nitrides. Thereamong, a carbon-based active material, a tin-based active material, a silicon-based active material, or a silicon-carbon-based active material is more preferable and may be used alone or in combination of two or more thereof.

The separator is interposed between the positive electrode and the negative electrode. As the separator, for example, an insulative thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In the case in which a solid electrolyte, such as polymer, is used as an electrolyte, the solid electrolyte may also function as the separator.

The non-aqueous electrolytic solution containing lithium salt is composed of an electrolytic solution and lithium salt. As the electrolytic solution, a non-aqueous organic solution, an organic solid electrolyte, or an inorganic solid electrolyte may be used.

As examples of the non-aqueous organic solution, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolytic solution, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature retention characteristics, the non-aqueous electrolytic solution may further include carbon dioxide gas. In addition, fluoro-ethylene carbonate (FEC), propene sultone (PRS), fluoro-propylene carbonate (FPC), etc. may be further included.

The secondary battery according to the present invention may be used as a unit battery of a battery module that is a power source of a middle or large-sized device, which particularly requires stability against high temperatures, long cycle and high rate characteristics, etc.

Specifically, the middle or large-sized device may be a power tool driven by a battery-based motor, an electric automobile, such as such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), or an electric golf cart. However, the present invention is not limited thereto.

In accordance with a further aspect of the present invention, there is provided a middle or large-sized battery pack using the secondary battery as a unit battery. The general structure and manufacturing method of the middle or large-sized battery pack are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a graph showing the results of charge and discharge in second cycles of batteries according to Experimental Example 1; and FIG. 2 is capacity differentiation curves in second to seventh cycles of batteries according to Experimental Example 2.

BEST MODE

Now, the present invention will be described in more detail with reference to the following examples. These examples are provided only for illustrating the present invention and should not be construed as limiting the scope and spirit of the present invention.

Example 1

Transition metal precursors, $NiCO_3$, $MnCO_3$, $RuO_2$, and $Li_2CO_3$, were placed in a planetary mill in the state in which the molar ratio of the transition metal precursors was 1:1.8:1.2:3 based on a stoichiometric ratio, and were mixed at a speed of 400 rpm for about 5 hours to obtain a mixture. The mixture was plasticized at an air atmosphere of 900° C. for 8 hours to manufacture a positive electrode active material doped with Ru, $0.5Li_2Ru_{0.6}Mn_{0.4}O_3*0.5LiNi_{0.5}Mn_{0.5}O_2$.

Comparative Example 1

$0.5Li_2Ru_{0.3}Mn_{0.7}O_3*0.5LiNi_{0.5}Mn_{0.5}O_2$ was manufactured in the same manner as in Example 1 except that transition metal precursors, $NiCO_3$, $MnCO_3$, $RuO_2$, and $Li_2CO_3$, were mixed in the state in which the molar ratio of the transition metal precursors was 1:2.4:0.6:3 based on a stoichiometric ratio.

Comparative Example 2

$0.5Li_2MnO_3*0.5LiNi_{0.5}Mn_{0.5}O_2$ was manufactured in the same manner as in Example 1 except that Ru salt was not used.

Experimental Example 1

7 weight % of denka black, as a conductive agent, and 6 weight % of PVDF, as a binder, were added to 87 weight % of the positive electrode active materials manufactured according to Example 1 and Comparative Examples 1 and 2 to manufacture positive electrode active mixtures. NMP was added to the manufactured positive electrode active mixtures to manufacture slurries. The manufactured slurries were applied to positive electrode current collectors, and were then pressed and dried to manufacture positive electrodes for secondary batteries. Porous polyethylene separators were interposed between the positive electrodes and negative electrodes based on lithium metal, and then lithium electrolytic solutions were injected to manufacture coin type lithium half-cell batteries.

The results of charge and discharge in second cycles of the coin type lithium half-cell batteries are shown in FIG. 1.

Referring to this figure, it can be seen that the battery according to Example 1 exhibits high capacity at a lower voltage than the batteries according to Comparative Examples 1 and 2 and that a voltage sagging phenomenon is reduced.

Experimental Example 2

The lithium half-cell batteries manufactured according to Experimental Example 1 using the positive electrode active materials manufactured according to Example 1 and Comparative Examples 1 and 2 were charged and discharged up to seventh cycles. Capacity differentiation curves in second to seventh electrochemical cycles of the batteries are shown in FIG. 2.

Referring to this figure, it can be seen that the battery according to Example 1 has a lower activation level in a colored portion in a dotted-line box than the batteries according to Comparative Examples 1 and 2, whereby a voltage sagging phenomenon is reduced even when a plurality of charge and discharge cycles is performed.

INDUSTRIAL APPLICABILITY

As is apparent from the above description, a positive electrode active material according to the present invention contains excessive lithium and a predetermined content of specific elements. Even at the time of high-voltage activation to utilize excess lithium, therefore, escape of oxygen may be prevented, whereby it is possible to secure structural stability. Consequently, it is possible to restrain voltage sagging due to the structural change of the positive electrode active material during cycles, thereby improving lifetime characteristics.

In addition, the irreversible capacity of the positive electrode active material may be reduced through sufficient utilization of excess lithium, thereby improving rate characteristics while exhibiting excellent charge and discharge efficiency.

Furthermore, voltage necessary for high-voltage activation may be lowered, with the result that it is possible to prevent the generation of oxygen radicals due to the restraint of the decomposition of an electrolytic solution, whereby the safety of a battery may be improved.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A positive electrode active material comprising at least one selected from among compounds represented by Formula 1 below:

$$xLi_2M_yMn_{(1-y)}O_{3-z}A_z*(1-x)LiM'O_{2-z'}A'_{z'} \quad (1),$$

where
M is at least one element selected from a group consisting of Ru, Mo, Nb, Te, Re, Ir, Pt, Cr, S, W, Os, and Po,
M' is at least one element selected from a group consisting of Ni, Ti, Co, Al, Mn, Fe, Mg, B, Cr, Zr, Zn, and second row transition metals,
A and A' are each independently a negative monovalent or divalent anion, wherein A and A' are each at least one element selected from a group consisting of halogen elements, sulfur, and nitrogen, and
$0<x<1$, $0.3<y<1$, $0<z\leq 0.5$, and $0\leq z'\leq 0.5$.

2. The positive electrode active material according to claim 1, wherein M is at least one element selected from a group consisting of Ru, Mo, S, W, Os, and Po.

3. The positive electrode active material according to claim 1, wherein M is Ru.

4. The positive electrode active material according to claim 1, wherein M' is $Mn_aM''_{1-a}$ (where M'' is at least one element selected from a group consisting of Ni, Ti, Co, Al, Fe, Mg, B, Cr, Zr, Zn, and second row transition metals, and $0<a<1$).

5. The positive electrode active material according to claim 4, wherein M'' is at least two elements selected from a group consisting of Ni, Ti, Co, Al, Fe, Mg, B, Cr, Zr, and Zn.

6. The positive electrode active material according to claim 1, wherein M' is $Mn_aNi_bCo_c$ (where $0<a<1$, $0<b<1$, $0<c<1$, and $a+b+c=1$).

7. The positive electrode active material according to claim 4, wherein $0<a<0.5$.

8. The positive electrode active material according to claim 1, wherein $0<x\leq 0.7$.

9. The positive electrode active material according to claim 1, wherein $0.4<y<1$.

10. The positive electrode active material according to claim 1, wherein $0<z\leq 0.2$ and $0\leq z'\leq 0.2$.

11. The positive electrode active material according to claim 1, wherein the compounds represented by Formula 1 above are layered composites or solid solutions.

12. A positive electrode formed by applying a positive electrode active material according to claim 1 to a current collector.

13. A lithium secondary battery comprising a positive electrode according to claim 12.

14. A battery module comprising a lithium secondary battery according to claim 13 as a unit battery.

15. A battery pack comprising a battery module according to claim 14.

16. A device using a battery pack according to claim 15 as a power source.

17. The device according to claim 15, wherein the device is an electric vehicle, a hybrid electric vehicle, a plug-in hybrid electric vehicle, or a power storage apparatus.

18. The positive electrode active material according to claim 6, wherein $0<a<0.5$.

* * * * *